United States Patent
Falcati

(10) Patent No.: US 7,109,914 B2
(45) Date of Patent: Sep. 19, 2006

(54) SWITCHING METHOD AND DEVICE ON AN AIRCRAFT RADIOFREQUENCY LANDING SYSTEM

(75) Inventor: Michel Falcati, Monferran Saves (FR)

(73) Assignee: Airbus France, Toulouse (FR)

( * ) Notice: Subject to any disclaimer, the term of this patent is extended or adjusted under 35 U.S.C. 154(b) by 150 days.

(21) Appl. No.: 10/801,578

(22) Filed: Mar. 17, 2004

(65) Prior Publication Data

US 2004/0217898 A1 Nov. 4, 2004

(30) Foreign Application Priority Data

Apr. 29, 2003 (FR) .................................. 03 05230

(51) Int. Cl.
*G01S 13/91* (2006.01)
(52) U.S. Cl. .......................................... 342/33; 342/35
(58) Field of Classification Search ................. 342/33, 342/35
See application file for complete search history.

(56) References Cited

U.S. PATENT DOCUMENTS

| | | | |
|---|---|---|---|
| 4,534,000 A * | 8/1985 | Bliss ........................... | 701/16 |
| 4,794,543 A | 12/1988 | Enein et al. | |
| 5,014,067 A | 5/1991 | Chisholm | |
| 6,469,654 B1 | 10/2002 | Winner et al. | |

\* cited by examiner

*Primary Examiner*—Thomas H. Tarcza
*Assistant Examiner*—Matthew M. Barker
(74) *Attorney, Agent, or Firm*—Stevens, Davis, Miller Mosher, LLP

(57) ABSTRACT

A method and device for carrying out switchover on a radio frequency landing system of an aircraft between a first input of a radio frequency receiver, which input is connected to a first antenna disposed on a lower part of the aircraft and receives a first signal, and a second input of the radio frequency receiver, which input is connected to a second antenna disposed on an upper part of the aircraft and receives a second signal. On initialization, switchover occurs to the input whose signal exhibits the highest level. After the initialization phase, a first value of a parameter, in relation to the aircraft, and a second value of this same parameter, in relation to the runway, are determined. The difference between these first and second values is computed, and switchover occurs to one of the first and second inputs as a function of this difference.

13 Claims, 3 Drawing Sheets

SWITCHING METHOD AND DEVICE ON AN AIRCRAFT RADIOFREQUENCY LANDING SYSTEM

The present invention relates to a switching method and device on a radio frequency landing system of an aircraft, in particular for a civil transport airplane.

As radio frequency landing system for aircraft, there is known in particular an "MLS" ("Microwave Landing System"), which is used as a radio frequency means of aiding automatic or manual approaches including rollout. The operational requirements make it necessary to employ an MLS system making it possible to perform the same type of operations as an instrument landing system of "ILS" ("Instrument Landing System") type, with the exclusion of guidance on takeoff when the aircraft presents its back to the corresponding transmitting station.

The following main constraints are related to such a type of approach:
 the discrepancy between the heading of the aircraft and the heading of the runway, which is significant at the start of approach,
 the attitudes of the aircraft throughout the approach,
 a known rule for the 19 feet in the final phase of the approach (vertical discrepancy between the trajectory passing through the receiving antenna and the trajectory passing beneath the main gear) [requirement imposed by international standards], and
 the shape of the radiation patterns of the antennas of the radio frequency landing system.

To be able to carry out such an approach, it is necessary to install two antennas on the aircraft: one in the front lower part and the other in the front upper part. More specifically, the significant discrepancy between the heading of the aircraft and the heading of the runway, combined with the attitudes of the aircraft during approach, necessitates the installation of an antenna in the upper part of the aircraft. Moreover, to comply with the 19-feet rule, the receiver of the radio frequency landing system must use the input which is connected to the lower antenna for the final phase of the approach.

The consequence of this antenna architecture is that the variation in the signal level received on the two radio frequency inputs of the receiver is not a phenomenon that can be reproduced from one approach to another (subject to the radiation patterns of the antennas which are dependent on the attitude of the aircraft and subject to its relative position with respect to the ground transmitter). Moreover, no physical law exists whereby it is possible to relate the signal level received on one of the inputs of the receiver, coming from the upper antenna, to the signal level received on the other input of the receiver, coming from the lower antenna.

In view of the radiation patterns of the antennas, it is moreover impossible to guarantee, during the final phase of approach, that the receiver input connected to the lower antenna always receives more signal level than this same receiver's other input connected to the upper antenna.

Moreover, in addition to the aforesaid constraints, related to the architecture of the aircraft, there also exist constraints related to said receiver of the radio frequency landing system.

A first constraint is that, in order to be able to compute the information necessary for guidance, it must have a sufficient signal level on the radio frequency input, that is to say a signal level greater than the sensitivity of the receiver, on at least one of the two radio frequency inputs. The antenna architecture guarantees that at least one of the two inputs of the receiver receives a sufficient signal level.

A second constraint is that such radio navigation equipment is not a measuring apparatus, and hence it is impossible to accurately measure a signal level at input. On the other hand, the receiver can formulate an item of information making it possible to determine which input of the receiver exhibits the highest signal level.

An object of the present invention is to remedy these drawbacks. It relates to a method making it possible to switch, simply and efficiently, between a first input, (connected to a lower antenna) and a second input (connected to an upper antenna) of a receiver of a radio frequency landing system of an aircraft, while taking account of the aforesaid constraints.

Therefore, according to the invention, said method is noteworthy in that:
 on initialization, switchover occurs to the input whose signal exhibits the highest level;
 after the initialization phase:
 a first value of a parameter, in relation to the aircraft, and a second value of this same parameter, in relation to the runway, is determined;
 the difference between these first and second values is computed; and
 switchover occurs to one of said first and second inputs, as a function of this difference; and
 at least one hysteresis loop around the switching values is provided.

In a first embodiment, said parameter is the azimuth.

In this case, advantageously, on initialization, switchover occurs to one of said inputs only if the level of the corresponding signal is sufficient to determine the azimuth of the aircraft.

Moreover, advantageously, if on initialization the two inputs exhibit the same signal level switchover occurs to said first input.

Preferably, a value of azimuth of the aircraft is determined on the basis of the signal received and this value of azimuth is compared to predetermined first and second values, and:
 when this value of azimuth lies between said predetermined first and second values, a first mode of switchover is implemented; and
 when this value of azimuth is less than or equal to said first value or greater than or equal to said second value, a second mode of switchover is implemented.

Advantageously, to implement said first mode of switchover:
 a first signal level emanating from said first input is compared to a second signal level recorded; and
 when said first signal level is greater than said second signal level, switchover occurs to said first input;
 otherwise, said second mode of switchover is implemented.

Preferably, said second signal level is obtained by averaging, over a predetermined duration, the signal present on the input to which switchover occurs first. The time interval, corresponding to said predetermined duration, taken into account in order to determine said second signal level, corresponds preferably to the first time interval starting from initialization and during which said value of azimuth lies between said predetermined first and second values.

Moreover, advantageously, to implement said second mode of switchover, switchover occurs to the input which exhibits the highest signal (level).

In a second embodiment, said parameter is the heading.

In this case, advantageously, the discrepancy between the heading of the aircraft and the heading of the runway is computed, and, when this discrepancy is less than a predetermined value, switchover occurs to said first input, otherwise switchover occurs to the input which exhibits the highest signal (level).

Moreover, advantageously, at least before switchover to the first input, one verifies whether a signal is present on this first input, and the switchover to said first input is carried out only if a signal is present.

The present invention also relates to a switching device for carrying out switchover, on a radio frequency landing system of an aircraft, between at least:
- a first input of a radio frequency receiver of said radio frequency landing system, which input is connected to a first antenna disposed on a lower part of the aircraft and receives a first signal; and
- a second input of the radio frequency receiver of said radio frequency landing system, which input is connected to a second antenna disposed on an upper part of the aircraft and receives a second signal.

According to the invention, said device is noteworthy in that it comprises means able to implement the aforesaid method.

Additionally, the present invention also relates to an aircraft radio frequency landing system, of the type comprising:
- a first antenna, which is disposed on a lower part of the aircraft;
- a second antenna, which is disposed on an upper part of the aircraft; and
- a radio frequency receiver comprising;
- a first input, which is connected to said first antenna;
- a second input, which is connected to said second antenna;
- an information processing unit; and
- a switching device disposed between said inputs and said information processing unit so as to carry out switchover between said first and second inputs.

According to the invention, said switching device is of the type of that mentioned above.

The figures of the appended drawing will aid comprehension of how the invention may be embodied. In these figures, identical references designate similar elements.

Figure 1:
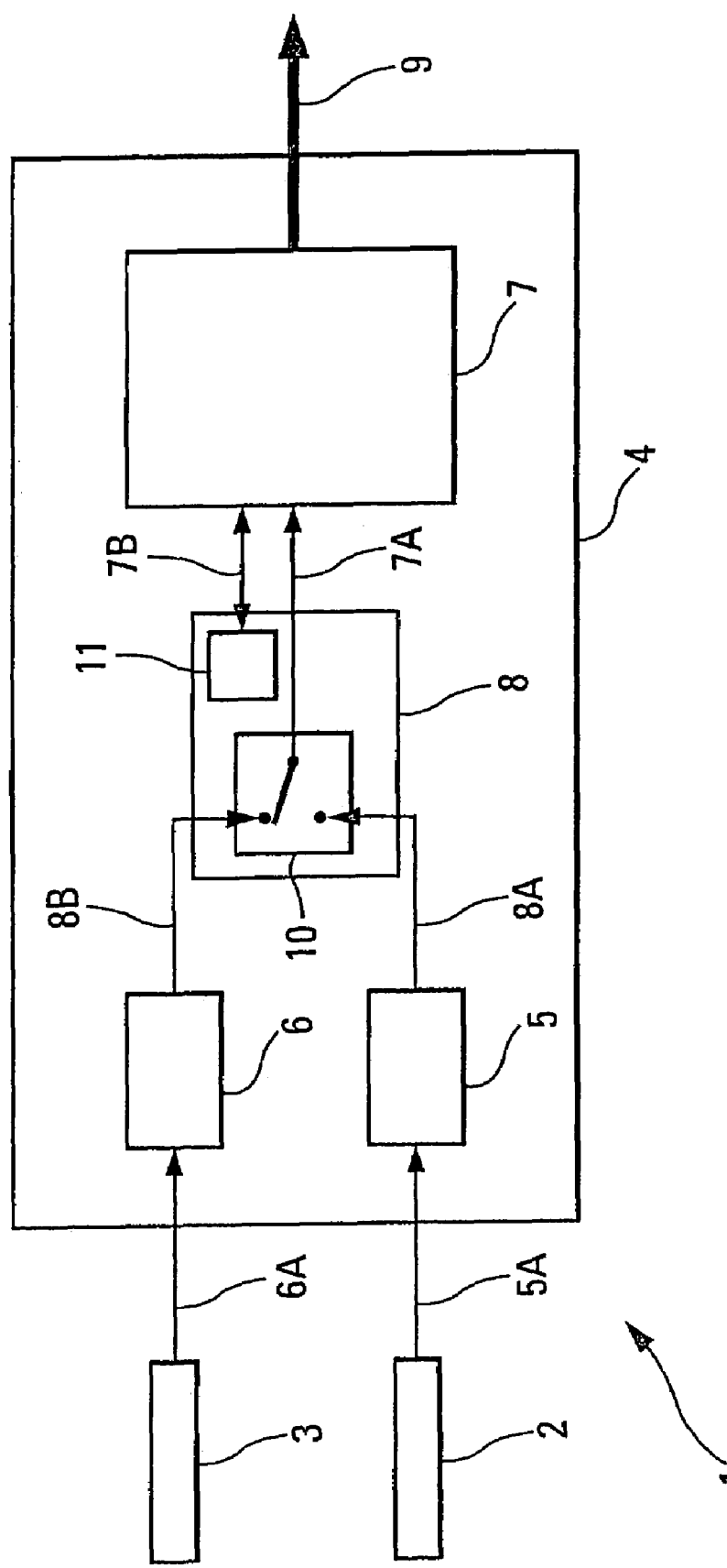
FIG. 1 is the schematic diagram of a radio frequency landing system in accordance with the invention.

The radio frequency landing system 1 in accordance with the invention and represented diagrammatically in FIG. 1, for example of the "MLS" ("Microwave Landing System") type, is intended to aid an aircraft (not represented), for example a civil transport airplane, during its approach to a landing runway with a view to its landing, and optionally during rollout over this runway.

Accordingly, said system 1 carried on board the aircraft comprises:
- a first antenna 2, which is disposed on a lower part (preferably at the front) of the aircraft;
- a second antenna 3, which is disposed on an upper part (preferably at the front) of the aircraft;
- a radio frequency receiver 4 comprising;
- a first (radio frequency) input 5, which is connected to said first antenna 2 by a link 5A;
- a second (radio frequency) input 6, which is connected to said second antenna 3 by a link 6A;
- an information acquisition and processing unit 7; and
- a switching device 8 in accordance with the invention, which is disposed between said inputs 5 and 6 (links 8A and 8B) and said information acquisition and processing unit 7 (links 7A and 7B) so as to carry out switchover between said first and second inputs 5 and 6 with regard to said information acquisition and processing unit 7.

Said antennas 2 and 3 are able to pick up electromagnetic waves transmitted from at least one transmitting station (not represented) installed on the ground. These electromagnetic waves are received and processed by the receiver 4, which deduces therefrom information that it is able to send to a user device (not represented) by way of a link 9. This information is then used by this user device, in particular to aid the aircraft during its approach.

According to the invention, said switching device 8 has the following characteristics:
- on initialization, it switches over, by way of a standard switching means 10, to the input 5, 6 whose signal exhibits the highest level;
- after the initialization phase:
  - it determines, for example by way of a computation unit 11 connected by the link 7B to the unit 7, a first value of a parameter, in relation to the aircraft, and a second value of this same parameter, in relation to the runway;
  - it computes, for example by way of the computation unit 11, the difference between these first and second values; and
  - it switches over, by way of the switching means 10, to one of said first and second inputs 5, 6 as a function of this difference; and
- it moreover comprises at least one hysteresis loop, around the switching values, as specified hereinbelow.

In a first embodiment, the azimuth is used as aforesaid parameter. The unit 7 of the receiver 4 formulates angle information corresponding to the position of the aircraft with respect to a horizontal approach axis and to the approach slope, depending on the runway. To provide the same type of information as a standard instrument landing system of "ILS" type [deviations expressed in "DDM" ("Difference in Depth of Modulation" units): information corresponding to the departure of the aircraft from the axis and to the approach slope], the receiver 4 converts this angle information into deviations expressed in DDM units, with the aid of known conversion formulae defined by international standards.

In this first embodiment:
- for initialization, the receiver 4 chooses the radio frequency input 5, 6 which exhibits first a signal level sufficient to perform the first computation of the azimuth; and
- if the two radio frequency inputs 5, 6 exhibit the same signal level, then the radio frequency input 5 connected to the lower antenna 2 is selected, to perform the computation of the deviations (azimuth).

Additionally, the receiver 4:
- determines a value of azimuth AZ of the aircraft on the basis of the signal received;
- compares this value of azimuth to predetermined first and second values −AZ1 and AZ1; and
- on the basis of this comparison, deduces therefrom which mode of switchover MC between two modes of switching MC1 and MC2 should be implemented by the switching device 8.

Figure 2:
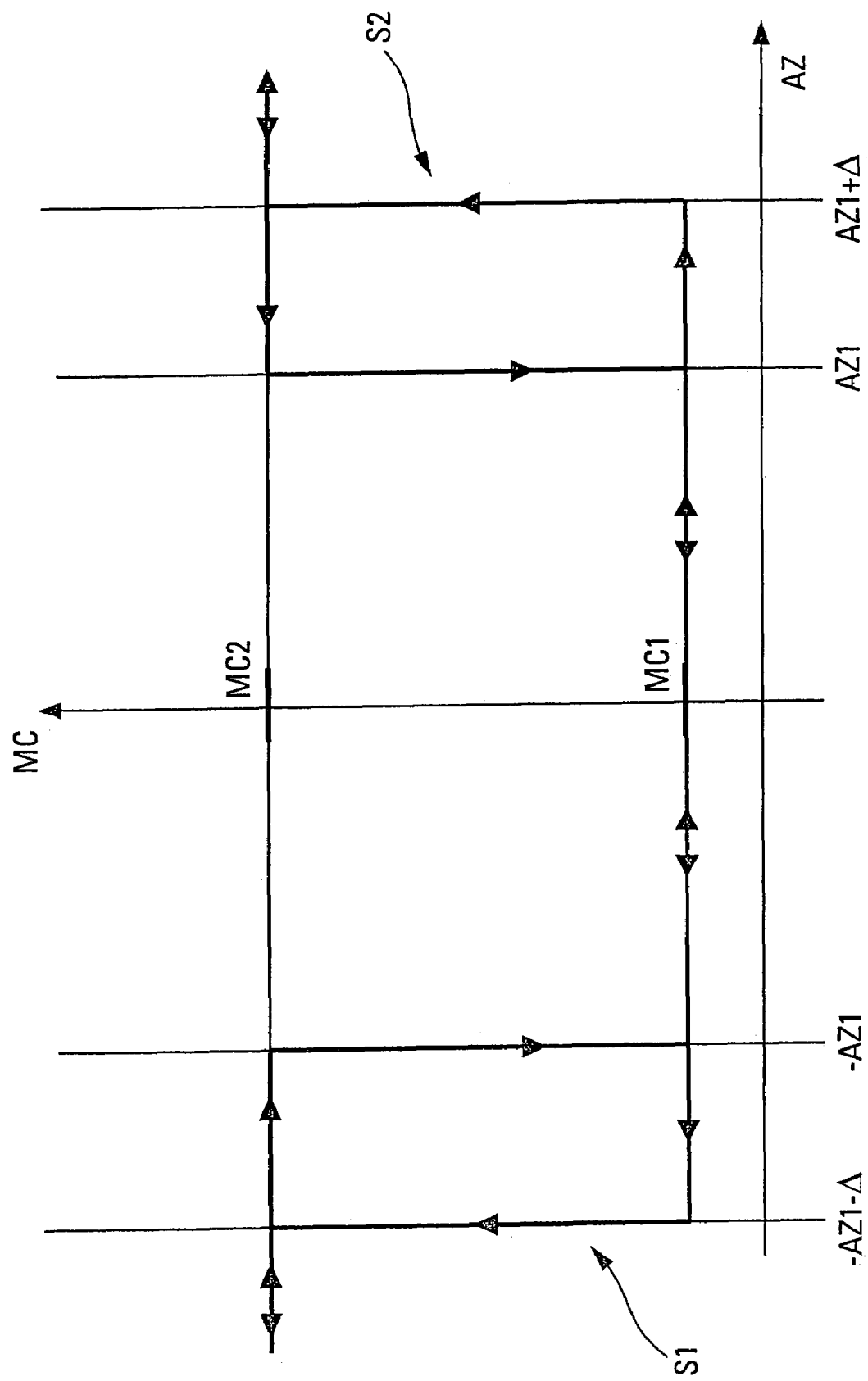
FIGS. 2 to 4 are graphics making it possible to explain a first embodiment of the invention.

Preferably, as represented in FIG. 2:
when this value of azimuth AZ lies between said predetermined first and second values −AZ1 and AZ1, said switching device 8 implements a first mode of switchover MC1; and
when this value of azimuth AZ is less than or equal to said first value −AZ1 or greater than or equal to said second value AZ1, said device 8 implements a second mode of switchover MC2.

To avoid overly frequent changes between the two modes of switching MC1 and MC2, hysteresis loops S1 and S2 of standard type are provided around the switching values −AZ1 and AZ1. The first hysteresis loop S1 uses values −AZ1−Δ and −AZ1 for the value of azimuth AZ, and the second hysteresis loop S2 uses values AZ1 and AZ1+Δ for the value of azimuth AZ.

By way of example, in a particular embodiment, the following particular values can be used:

AZ1=0.200 DDM; and

Δ=0.100 DDM.

Figure 3:
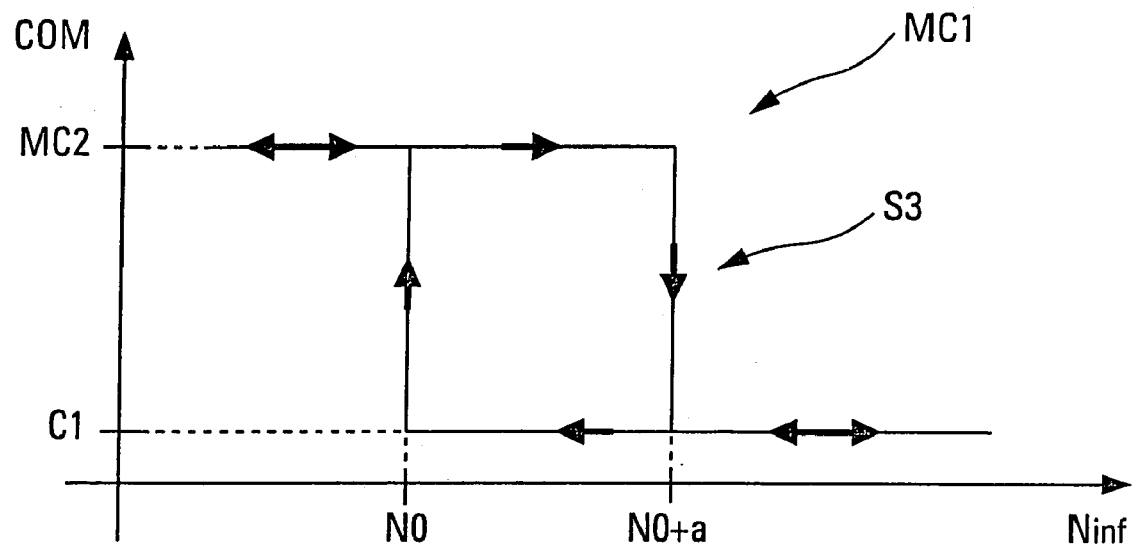

According to said first mode of switchover MC1, as represented in FIG. 3, the receiver 4:
measures the signal level Ninf at the input 5 connected to the lower antenna 2;
compares this signal level Ninf to a predetermined signal level N0; and
as a function of this comparison:
if Ninf is greater than N0, switches over to the input 5 connected to the lower antenna 2 (switching C1);
otherwise, implements the second mode of switchover MC2, specified hereinbelow.

Said signal level N0 is obtained by averaging, over a predetermined duration, for example 500 ms, the signal present on the input 5, 6 to which switchover occurs first. The time interval, corresponding to said predetermined value, taken into account in order to determine said second signal level, corresponds preferably to the first time interval starting from initialization and during which said value of azimuth lies between said predetermined first and second values. This value N0 is then recorded. This average makes it possible to smooth the signal level over time and to reduce the effect of noise.

Moreover, a hysteresis loop S3 is provided, which is defined between the value N0 and a value N0+a, a being for example equal to 2 dB.

Figure 4:
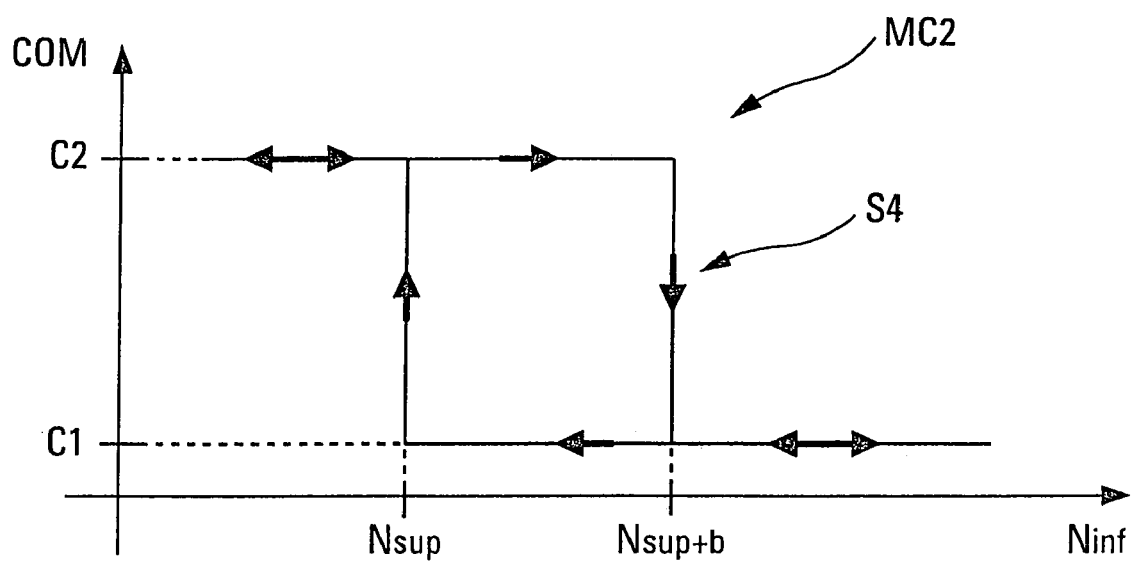

According to said second mode of switchover MC2, as represented in FIG. 4, said receiver 4:
compares the signal level Ninf at the input 5 (connected to the lower antenna 2) to the signal level Nsup at the input 6 (connected to the upper antenna 3); and
as a function of this comparison:
if Ninf is greater than Nsup, switches over to the input 5 (connected to the lower antenna 2) [switching C1];
otherwise, switches over to the input 6 (connected to the upper antenna 3) [switching C2].

Moreover, a hysteresis loop S4 is provided, which is defined between the value Nsup and a value Nsup+b, b being for example equal to 2 dB.

Additionally, once the receiver 4 no longer has sufficient signal on the two inputs 5 and 6, the deviations pass to the non-valid state, and the previous steps are repeated when one of the two inputs 5 and 6 receives sufficient signal level to compute deviations.

In a second embodiment of the invention, the heading of the aircraft and the heading of the runway are used as aforesaid parameter.

In this case, the receiver 4 is, for example, a landing aid multimode receiver of "MMR" ("Multi-Mode Receiver") type, which, in a standard manner, receives the heading on a GPS map, on the basis of the information emanating from inertial platforms of "IRS" ("Inertial Reference System") type.

When the absolute value of the discrepancy between the heading of the runway and the heading of the aircraft is less than a predetermined value, this value being dependent on the radiation patterns of the antennas 2 and 3 and on the attitudes of the aircraft, the switching device 8 of the receiver 4 switches over to the input 5 connected to the lower antenna 2. This logic can be consolidated using a measurement of level on this input 5.

When said absolute value of the discrepancy between the heading of the runway and the heading of the aircraft is greater than said predetermined value, the switching device 8 of the receiver 4 switches over to the input 5, 6 which exhibits the highest signal level.

Moreover, in this second embodiment:
on initialization, the receiver 4 uses the antenna 2, 3 (input 5, 6) which exhibits the most signal level; and
after the initialization phase, when the discrepancy between the heading of the aircraft and the heading of the runway is less than a predetermined value, the receiver 4 switches over to the input 5 connected to the lower antenna 2.

Additionally:
to cover the case where the discrepancy between the heading of the aircraft and the heading of the runway remains close to the switching value for a long time, a hysteresis loop is implemented to avoid overly frequent and unnecessary switchings between the input 6 connected to the upper antenna 3 and the input 5 connected to the lower antenna 2; and
to cover cases of undetected failure of the lower antenna 2, a measurement of the level on the input 5 connected to this lower antenna 2 is carried out before switching, so as not to force the use of the lower antenna 2 if it is not receiving any signal.

The invention claimed is:

1. A method of switching for carrying out switchover, on a radio frequency landing system of an aircraft, between at least:
a first input of a radio frequency receiver of the radio frequency landing system, which input is connected to a first antenna disposed on a lower part of the aircraft and receives a first signal; and
a second input of the radio frequency receiver of the radio frequency landing system, which input is connected to a second antenna disposed on an upper part of the aircraft and receives a second signal, wherein:
on initialization, switchover occurs to the input whose signal exhibits the highest level;
after the initialization phase:
a first value of a parameter, in relation to the aircraft, and a second value of this same parameter, in relation to the runway, is determined;
the difference between these first and second values is computed; and
switchover occurs to one of said first and second inputs, as a function of this difference; and
at least one hysteresis loop around the switching values is provided.

2. The method as claimed in claim 1, wherein said parameter is the azimuth.

3. The method as claimed in claim 2, wherein if, on initialization, the two inputs exhibit the same signal level, switchover occurs to said first input.

4. The method as claimed in claim 2, wherein a value of azimuth of the aircraft is determined on the basis of the signal received and this value of azimuth is compared to predetermined first and second values, and wherein:
when this value of azimuth lies between said predetermined first and second values, a first mode of switchover is implemented; and
when this value of azimuth is less than or equal to said first value or greater than or equal to said second value, a second mode of switchover is implemented.

5. The method as claimed in claim 4, wherein, to implement said first mode of switchover:
a first signal level of said first signal emanating from said first antenna is compared to a second signal level recorded; and
when said first signal level is greater than said second signal level, switchover occurs to said first input;
otherwise, said second mode of switchover is implemented.

6. The method as claimed in claim 5, wherein said second signal level is obtained by averaging, over a predetermined duration, the signal present on the input to which switchover occurs first.

7. The method as claimed in claim 4, wherein, to implement said second mode of switchover, switchover occurs to the input which exhibits the highest signal.

8. The method as claimed in claim 1, wherein said parameter is the heading.

9. The method as claimed in claim 8, wherein the discrepancy between the heading of the aircraft and the heading of the runway is computed, and wherein, when this discrepancy is less than a predetermined value, switchover occurs to said first input, otherwise switchover occurs to the input which exhibits the highest signal.

10. The method as claimed in claim 8, wherein, at least before switchover to the first input, one verifies whether a signal is present on this first input, and wherein the switchover to said first input is carried out only if a signal is present.

11. A switching device for carrying out switchover, on a radio frequency landing system of an aircraft, between at least:
a first input of a radio frequency receiver of said radio frequency landing system, which input is for being connected to a first antenna disposed on a lower part of the aircraft and receives a first signal; and
a second input of the radio frequency receiver of said radio frequency landing system, which input is for being connected to a second antenna disposed on an upper part of the aircraft and receives a second signal, which device comprises means able to implement the method specified in claim 1.

12. An aircraft radio frequency landing system comprising:
a first antenna, which is disposed on a lower part of the aircraft;
a second antenna, which is disposed on an upper part of the aircraft; and
a radio frequency receiver comprising;
a first input, which is connected to said first antenna;
a second input, which is connected to said second antenna;
an information processing unit; and
a switching device disposed between said inputs and said information processing unit so as to carry out switchover between said first and second inputs, wherein said switching device is of the type of that specified in claim 11.

13. A method of switching for carrying out switchover, on a radio frequency landing system of an aircraft, between at least:
a first input of a radio frequency receiver of the radio frequency landing system, which input is connected to a first antenna disposed on a lower part of the aircraft and receives a first signal; and
a second input of the radio frequency receiver of the radio frequency landing system, which input is connected to a second antenna disposed on an upper part of the aircraft and receives a second signal, wherein:
on initialization, switchover occurs to one of said inputs only if the level of the corresponding signal is sufficient to determine the azimuth of the aircraft;
after the initialization phase:
a first value of an azimuth parameter, in relation to the aircraft, and a second value of this same azimuth parameter, in relation to the runway, is determined;
the difference between these first and second values is computed; and
switchover occurs to one of said first and second inputs, as a function of this difference; and
at least one hysteresis loop around the switching values is provided.

* * * * *